United States Patent
Blommer

[19]

[11] Patent Number: 6,012,426
[45] Date of Patent: Jan. 11, 2000

[54] AUTOMATED PSYCHOACOUSTIC BASED METHOD FOR DETECTING BORDERLINE SPARK KNOCK

[75] Inventor: Michael Alan Blommer, Ann Arbor, Mich.

[73] Assignee: Ford Global Technologies, Inc., Dearborn, Mich.

[21] Appl. No.: 09/184,267

[22] Filed: Nov. 2, 1998

[51] Int. Cl.[7] ............................. F02P 5/15; G01L 23/22
[52] U.S. Cl. .................................. 123/406.38; 73/35.09; 123/406.37
[58] Field of Search ................... 123/406.37, 406.38; 73/35.03, 35.04, 35.06, 35.07, 35.09; 701/111

[56] References Cited

U.S. PATENT DOCUMENTS

| | | | |
|---|---|---|---|
| 3,885,720 | 5/1975 | Brennan | 123/406.29 |
| 4,012,942 | 3/1977 | Harned | 73/35.03 |
| 4,481,924 | 11/1984 | Kobayashi | 73/35.05 |
| 4,617,895 | 10/1986 | Sakakibara | 123/406.38 |
| 5,027,774 | 7/1991 | Dutkiewicz et al. | 123/406.26 |
| 5,284,047 | 2/1994 | Brokaw | 73/35.07 |
| 5,386,722 | 2/1995 | Meyer et al. | 73/117.3 |
| 5,535,722 | 7/1996 | Graessley et al. | 123/406.21 |
| 5,892,375 | 4/1999 | Vulih et al. | 327/65 |

*Primary Examiner*—Tony M. Argenbright
*Attorney, Agent, or Firm*—Jerome R. Drouillard; Roger L. May

[57] ABSTRACT

An automated method for detecting borderline spark knock in a spark ignition engine imitates borderline knock procedures in which human operators listen to engine sounds as a function of spark timing. The automated method employs a psychoacoustic model and a psychophysical process to estimate borderline spark knock. The psychoacoustic model represents the acoustic activity in the human auditory system in response to engine sounds. The psychoacoustic model is monitored as a function of spark timing to detect audible spark knocks. The psychophysical process alters the spark timing for detecting spark knocks until the spark timing converges to a value corresponding to borderline knock. The automated method eliminates human operator subjectivity in estimating borderline knock.

9 Claims, 2 Drawing Sheets

AUTOMATED PSYCHOACOUSTIC BASED METHOD FOR DETECTING BORDERLINE SPARK KNOCK

TECHNICAL FIELD

The present invention relates to borderline spark knock detectors for spark ignition internal combustion engines.

BACKGROUND ART

In a conventional internal combustion engine for automotive vehicles, a fuel and air mixture is provided in correct proportions and a spark is used for igniting the air/fuel mixture. The spark is timed in relation to the position of the pistons in the engine cylinders to generate maximum torque while avoiding abnormal combustion of the air/fuel mixture. The variables that influence the optimum engine spark timing for any given operating condition include engine speed, manifold pressure, coolant temperature, intake air temperature, ambient pressure, and fuel octane. The correct spark timing based upon the instantaneous values for these variables is stored in a look-up table in the memory of a microprocessor, which forms a part of the electronic engine control system.

One of the chief parameters to be considered in such control systems is borderline spark knock. A spark knock in spark ignition engines produces a characteristic pinging sound that is audible to the human ear if the knock intensity is loud enough. Borderline knock is defined as the knock intensity level at which the pinging sound is barely discernible to the trained ear of a person riding within the vehicle.

The purpose of a control system using a knock detector is not to eliminate knock. To the contrary, engine performance suffers when knock is eliminated. Although, excessive knock can damage the engine. Thus, it is desirable to have knock present to some extent. On the other hand, audible knock is aesthetically objectionable. It is thus desirable to control engine operation so that knock is allowed, particularly at wide open throttle conditions, but is not permitted to become loud enough to be heard by the vehicle occupants. A typical control strategy distinguishes between acceptable and unacceptable levels of knock. The control system adjusts the spark advance until an acceptable level of knock is achieved. Accurate control of knock permits the engine to be calibrated closer to the optimum ignition timing. The borderline knock level represents the maximum allowable knock intensity.

Listening for borderline detonation is an integral part of the mapping and calibration of spark ignited engines. Under most operating conditions, if spark timing is advanced far enough the engine will begin to knock audibly. Borderline refers to the spark timing at which the knock intensity is just at the threshold of audibility.

Listening for the knocks is done both in operating vehicles and in dynamometer cells by trained human operators. In dynamometer cells which have separate control rooms, the engine sounds are picked up with a microphone and heard either through headphones or a loudspeaker by the human operator. The knocks must be detected in the presence of a variety of non-combustion related sounds from the engine (e.g., rod knock or piston slap) as well as other sounds present in the test cell or vehicle. These other sounds may either mask the knocks or, in the case of mechanical sounds such as jack shaft rattle, may actually mimic the knocks.

Prior art systems and methods for detecting and controlling borderline detonation is for human operators to listen carefully to the engine while adjusting the spark timing. The human operators subjectively estimate the borderline knock.

What is needed is to automate the prior art "human-in-the-loop" systems and methods for detecting and controlling borderline by real-time analysis of the knocks. Such an automated method would imitate human operators listening to engine sounds as a function of spark timing.

DISCLOSURE OF THE INVENTION

A general object of the present invention is to provide an automated system and method employing a psychoacoustic model and a psychophysical concept to detect borderline spark knock in a spark-ignition engine.

In carrying out the above object and other objects, the present invention provides a method for detecting borderline spark knock in a spark ignition engine. The method includes positioning a microphone adjacent to a spark ignition engine. A microphone signal indicative of audible engine sounds is then generated. The microphone signal is then processed to estimate the acoustic activity which takes place in the auditory system of a human in response to the audible engine sounds. An excitation signal indicative of the estimated acoustic activity is then generated. The excitation signal is then processed to identify audible spark knocks as a function of engine spark timing. A detection signal indicative of audible spark knocks is then generated. The detection signal is then processed to compare the rate of audible spark knocks to a desired rate corresponding to borderline knock. The engine spark timing is then adjusted as a function of the rate of audible spark knocks until the rate of audible spark knocks converges to the desired rate.

The advantages accruing to the present invention are numerous. In addition to reducing engine development costs, the present invention eliminates variations due to differences across operators (e.g., vigilance, fatigue, training) and differences in listening environments.

These and other features, aspects, and embodiments of the present invention will become better understood with regard to the following description, appended claims, and accompanying drawings.

BEST MODES FOR CARRYING OUT THE INVENTION

Figure 1:
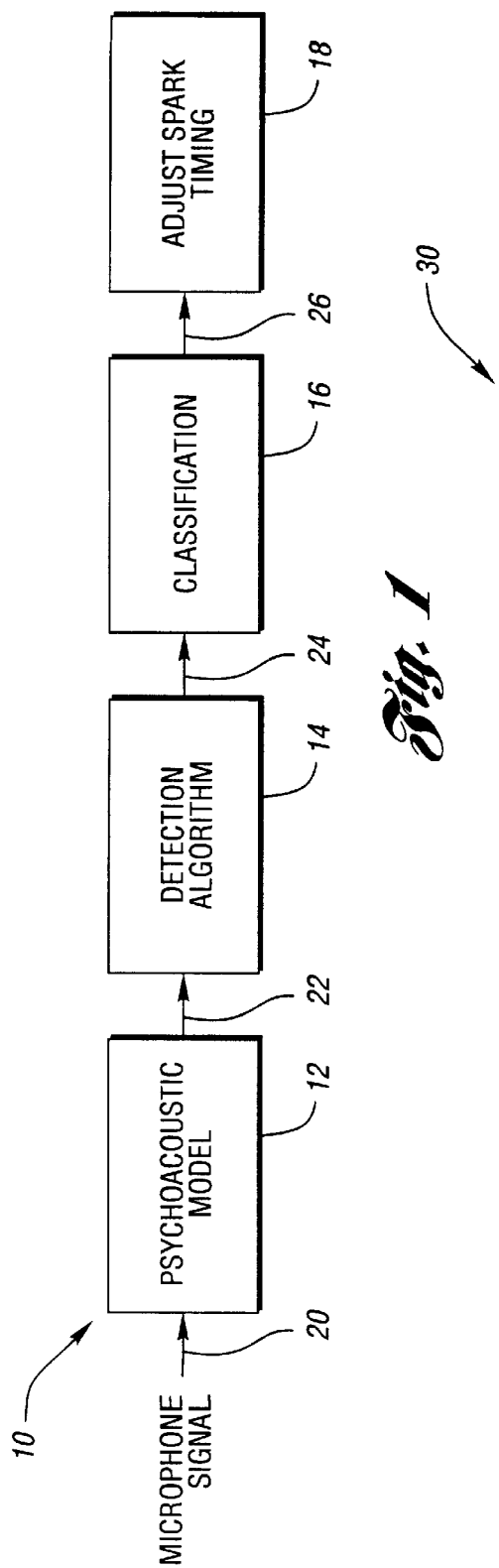
FIG. 1 is a flow diagram representing operation of the automated borderline spark knock detection system and method of the present invention.

Referring now to FIG. 1, a flow diagram 10 representing operation of the automated borderline spark knock detection system and method of the present invention is shown. The detection system and method are preferably for use in a typical dynamometer cell, but could be adapted to other relevant environments such as hemi-anechoic dynamometer cells and operating vehicles.

The dynamometer cell is preferably capable of testing a full powertrain (i.e., engine and transmission). An automatic transmission is equipped with a PRNDL shift control robot and a manual transmission is equipped with an "autodriver" capable of shifting through all gears dynamically while operating the clutch. In the dynamometer cell, a microphone for detecting audible sounds is positioned adjacent the spark ignition engine of an automotive vehicle and pointed directly thereto.

Flow diagram 10 includes four stages: a psychoacoustic model stage 12, a detection algorithm stage 14, a classification stage 16, and an adjust spark timing stage 18. The stages of flow diagram imitate current borderline knock procedures, i.e., human operators listening to engine sounds as a function of spark timing, by employing psychoacoustic models and psychophysical concepts to detect borderline spark knock. As a result, the process of detecting borderline can be automated by real-time analysis of the microphone signals.

Initially, psychoacoustic model stage 12 receives a microphone signal 20 representing audio sounds of the spark ignition engine. Stage 12 processes the microphone signal to estimate the acoustic activity which takes place in the auditory system of a human operator in response to the audio sounds of the engine. In essence, stage 12 attempts to represent the excitation level, or acoustic activity, in the auditory system of the human operator in response to engine sounds. Stage 12 then generates an excitation signal 22 indicative of the estimated acoustic activity.

Detection algorithm stage 14 receives excitation signal 22 from stage 12 and processes it to identify audible spark knocks. Stage 14 monitors the excitation signals generated by stage 12 as a function of spark timing. Stage 14 is automated and eliminates human subjective impressions of spark knock. Stage 14 then generates a detection signal 24 indicative of audible spark knocks.

Classification stage 16 receives detection signal 24 from stage 14 and processes it to classify the engine sound as either borderline, below borderline, or above borderline. Preferably, borderline is defined as a knock rate falling within a range of one to two spark knocks every five seconds. Thus, if the knock rate is less than this, the engine sound is classified as below borderline. Similarly, if the knock rate is higher than this, the engine sound is classified as above borderline.

In response to the classification, adjust spark timing stage 18 adjusts the spark timing of the engine using an appropriate psychophysical search procedure. Appropriate psychophysical search procedures are described by H. Levitt, "Transformed Up-Down Methods in Psychophysics," *The Journal of the Acoustical Society of America*, 1971, vol. 49, pp 467–477, which is hereby incorporated by reference. In essence, stage 18 increases the spark timing if the classification was below borderline and decreases the spark timing if the classification was above borderline. The stages shown in flow diagram 10 are repeated until the spark timing value converges to a desired value corresponding to borderline knock.

Figure 2:
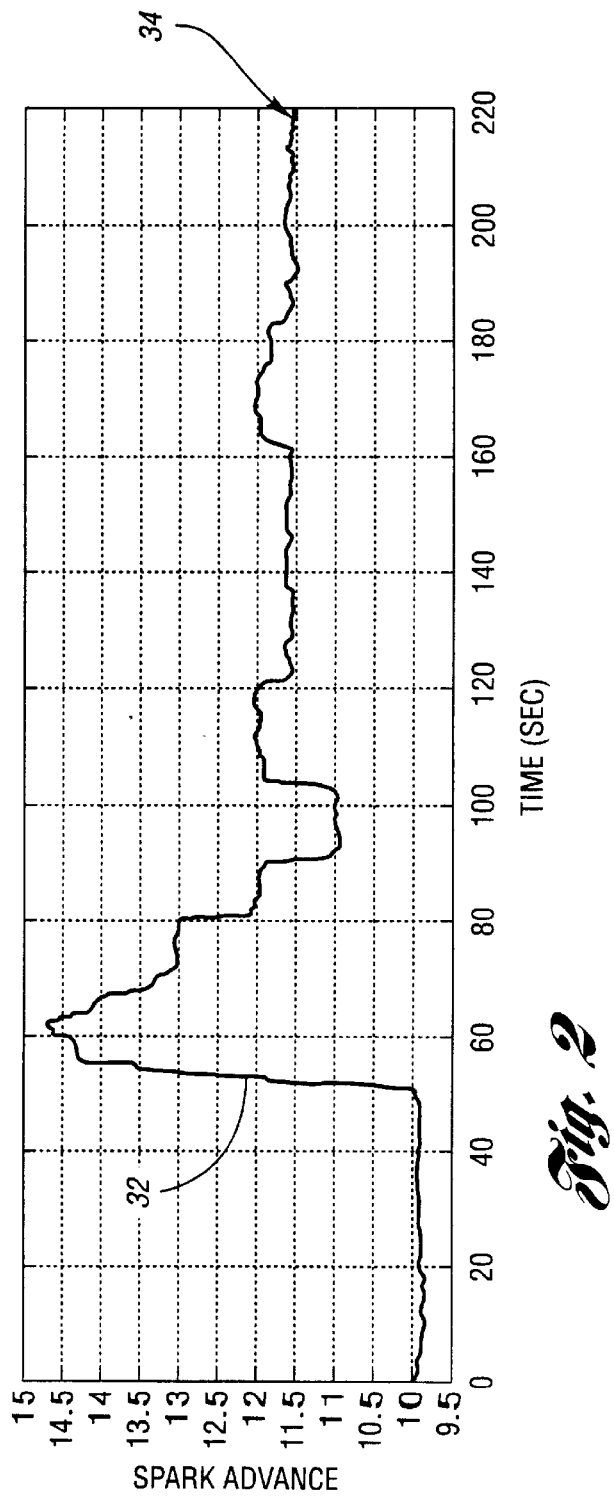
FIG. 2 is a plot of the spark advance as a function of time.

Referring now to FIG. 2, a graph 30 having a plot of spark advance 32 as a function of time is illustrated. Spark advance is equal to the spark timing and a constant. As shown in graph 30, increasing and decreasing runs of spark timing are alternated until the spark advance value converges to a desired spark advance value 34 corresponding to borderline knock.

Figure 3:
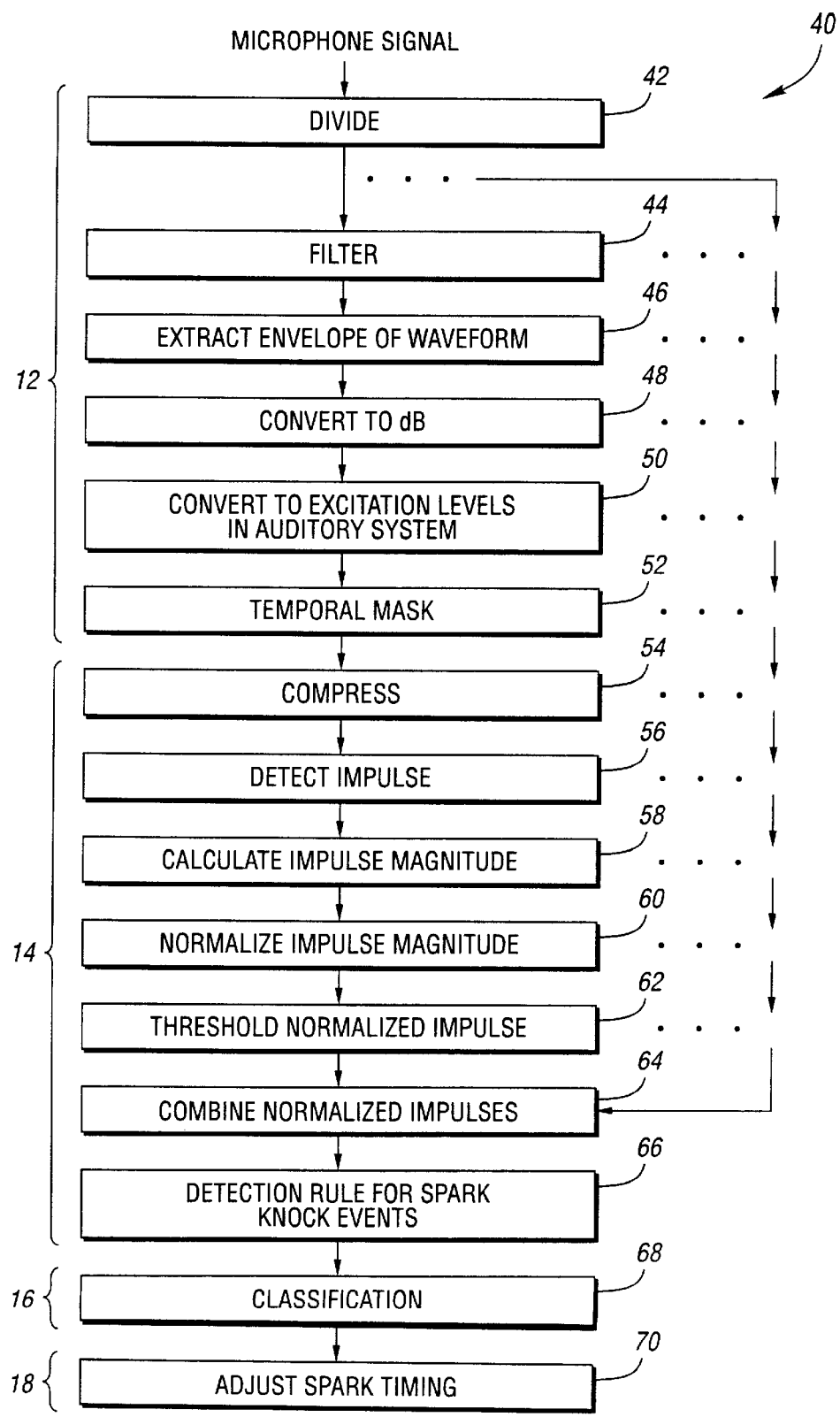
FIG. 3 is a detailed flow diagram representing operation of the system and method of the present invention.

Referring now to FIG. 3, a highly detailed flow diagram 40 representing operation of the present invention is shown. Flow diagram 40 includes psychoacoustic model stage 12, detection algorithm stage 14, classification stage 16, and adjust spark timing stage 18. Psychoacoustic model stage 12 consists of blocks 42, 44, 46, 48, 50, and 52. Detection algorithm stage 14 consists of blocks 54, 56, 58, 60, 62, 64, and 66. Classification stage 16 consists of block 68. Adjust spark timing stage consists of block 70.

In operation, a block 42 divides microphone signal 20 into preferably five equal signals. Microphone signal 20 is an electrical signal representing audio sounds of the spark ignition engine. For simplicity, flow diagram 40 illustrates the processing operation of only one of the divided signals. It is to be appreciated that the processing operation is the same for each of the divided signals.

Block 44 then filters the divided signal to extract signals with different frequency content. Block 44 includes a bank of preferably five bandpass filters, known as critical band filters, each corresponding to a respective divided signal. Each bandpass filter is preferably a ⅓ octave filter. Each bandpass filter receives its respective divided signal to pass a signal of desired frequency content.

Preferably, the bank of bandpass filters have center frequencies of 4 kHz, 5 kHz, 6.3 kHz, 8 kHz, and 10 kHz.

Block 44 suppresses frequencies outside a range of 4–10 kHz because there is very little spark knock energy outside this frequency range in most spark ignition engines. Further, the frequencies below 4 kHz are suppressed to remove extraneous signals such as those caused by engine roughness. However, the frequency range could be modified for those engines containing significant spark knock energy outside this range.

Block 46 then extracts the envelope of the waveform of the divided filtered signal. Block 48 then converts the extracted envelope to decibel (dB). Block 50 then converts the extracted envelope to an excitation level corresponding to an excitation level used in the human auditory system. Block 52 then temporal masks the extracted envelope. In essence, blocks 46, 48, 50, and 52 model non-linear processing in the human auditory system, resulting in a time-frequency representation of the acoustic activity in the human auditory system.

Block 54 of detection algorithm 14 then compresses through $\log_2()$ the output of temporal masking block 52. The output of temporal masking block 52 is in units of sone/bark, which generally follows a doubling law. That is, if sound A generates x sone/bark in a particular critical band, then doubling the loudness of A will generate approximately 2x sone/bark in that critical band. Compression through $\log_2()$ allows for computing relative changes in the excitation level, independent of the absolute value (e.g., independent of x in the example).

Block 56 then detects the impulse of the compressed output signal from block 54. To detect the impulse, block 56 uses standard peak picking algorithms, and the peaks are selected such that they are the largest peaks within a neighborhood of approximately ten milliseconds.

Block 58 then calculates the magnitude of the impulse detected by block 56. To calculate the impulse magnitude, the difference between the peak value and the local minimum within a ten millisecond neighborhood preceding the peak is calculated. It is to be noted that there is psychoacoustic evidence suggesting that impulsive sounds are generated by sudden increases in the excitation level over an interval of approximately ten milliseconds.

Block 60 then normalizes the impulse magnitude calculated by block 58. Block 60 performs different procedures for two different cases. The first case is performed during the initialization of detection algorithm stage 14. In the first case, if the sound is known to be in a below borderline condition, the root-mean square (RMS) of the impulse magnitude is calculated and saved. The second case is performed during the search for borderline knock. In this case, the impulse magnitudes are normalized by the RMS calculated in the first case.

Block 62 then thresholds the normalized magnitudes. Block 62 keeps only those normalized impulses that have magnitudes greater than "a". Empirically, a =2 has resulted in satisfactory agreement of the algorithm with classifications of borderline knock by human operators. Normalized impulses with magnitudes greater than two are probable "outliers" in the set of observed impulses. This is similar to a data point being more than two standard deviations away from the mean.

Block 64 then combines the normalized impulses across the critical bands from the five divided signals. To combine the divided signals, block 64 searches for time-alignment of the impulses across the critical bands. Specifically, at time sample t, block 64 identifies normalized impulses across the critical bands that are within a temporal window centered at t, and of approximately five millisecond duration. Block 64 then computes the sum-of-squares of the identified normalized impulses for time sample t, and then takes the square root of the result. The result is an amplitude, K(t).

Block 64 follows a combination rule in that there must be a contribution to K(t) from at least one of the following critical bands: 6.3 kHz, 8 kHz, or 10 kHz. If there is not, block 64 sets K(t)=0. Each one of the events with K(t)>0 is defined as a potential knock event.

Block 66 then processes the potential knock events in accordance with detection rules to identify audible spark knocks. Specifically, if K(t) is at least 3.0, then the potential knock event is labeled as a spark knock event. The implication of K(t) being at least 3.0 is that these impulses are significant "outliers" that likely illicit the audible perception of spark knock.

Block 68 of classification stage 16 then analyzes the rate of spark knock events to classify the audible sound as a function of the spark timing. The following classification introduced above is an example. If the rate of spark knock events falls within a range of one to two events every five seconds, then the engine condition is classified as borderline. If the rate of spark knock events is less than one every five seconds, then the engine condition is classified as below borderline. If the rate of spark knock events is greater than two every five seconds, then the engine condition is classified as above borderline.

In response to the classification, block 70 of adjust spark timing stage 18 adjusts the spark timing of the engine using an appropriate psychophysical search procedure. Block 70 generally increases the spark timing if the classification was below borderline and generally decreases the spark timing if the classification was above borderline until the spark timing value converges to a desired value corresponding to borderline knock. Accordingly, at borderline, the rate of spark knocks is equal to a desired spark knock rate corresponding to borderline knock.

The psychophysical search procedures used by block 70 preferably is the two down, one up Levitt procedure. This procedure is characterized by decreasing the spark advance after two consecutive classifications of above borderline, and increasing the spark advance after one classification of below borderline. Of course, other psychophysical search procedures which mimic the method of adjustment, the method of constant stimuli or the method of limits, may be employed.

Thus, it is apparent that there has been provided, in accordance with the present invention, an automated system and method employing a psychoacoustic model and a psychophysical concept to detect borderline spark knock in a spark-ignition engine that fully satisfies the objects, aims, and advantages set forth above.

While the best modes for carrying out the present invention have been described in detail, those familiar with the art to which the present invention relates will recognize various alternative designs and embodiments for practicing the present invention as defined by the following claims.

What is claimed is:

1. A method for detecting borderline spark knock in a spark ignition engine, comprising:

positioning a microphone adjacent to a spark ignition engine;

generating a microphone signal, wherein the microphone signal is indicative of audible engine sounds;

processing the microphone signal to estimate the acoustic activity which takes place in the auditory system of a human in response to the audible engine sounds;

generating an excitation signal indicative of the estimated acoustic activity;

processing the excitation signal to identify audible spark knocks as a function of engine spark timing;

generating a detection signal indicative of audible spark knocks;

processing the detection signal to compare the rate of audible spark knocks to a desired rate corresponding to borderline knock; and adjusting the engine spark timing as a function of the rate of audible spark knocks until the rate of audible spark knocks converges to the desired rate.

2. The method of claim 1 further comprising:

classifying the rate of audible spark knocks as borderline, above borderline, or below borderline, wherein borderline occurs when the rate of audible spark knocks corresponds to the desired rate.

3. The method of claim 2 wherein adjusting comprises:

increasing the engine spark timing by a step size if the rate of audible spark knocks is classified as below borderline.

4. The method of claim 2 wherein adjusting comprises:

decreasing the engine spark timing by a step size if the rate of audible spark knocks is classified as above borderline.

5. The method of claim 1 wherein:

the spark ignition engine is placed within a dynamometer cell.

6. The method of claim 1 wherein processing the microphone signal comprises:

dividing the microphone signal into a plurality of signals;

bandpass filtering each of the divided signals to pass signals having desired center frequencies; and processing the bandpass signals to generate the excitation signal indicative of the estimated acoustic activity.

7. The method of claim 6 wherein processing the bandpass signals comprises:

extracting an envelope signal indicative of the waveform envelope for each of the bandpass signals;

converting the envelope signal for each of the bandpass signals to an excitation level corresponding to an excitation level used in the human auditory system; and temporal masking the converted envelope signal for each of the bandpass signals.

8. The method of claim 7 wherein processing the excitation signal comprises:

compressing the temporal masked converted envelope signal for each of the bandpass signals;

detecting impulses of the temporal mask converted envelope signal for each of the bandpass signals;

calculating the magnitudes of the detected impulses for each of the bandpass signals;

normalizing the calculated impulse magnitudes for each of the bandpass signals; and thresholding the normalized impulse magnitudes for each of the bandpass signals.

9. The method of claim 8 wherein generating a detection signal comprises:

combining the normalized impulse magnitudes of the bandpass signals into a combined bandpass signal; and comparing the magnitude of the combined bandpass signal to a given magnitude threshold, wherein an audible spark knock occurs when the magnitude of the combined bandpass signal is greater than the given magnitude threshold.

* * * * *